US012617717B2

(12) United States Patent
Al Mehthel et al.

(10) Patent No.: US 12,617,717 B2
(45) Date of Patent: May 5, 2026

(54) COMPOSITIONS AND METHODS RELATING TO INCREASED CARBON DIOXIDE UPTAKE IN MIXING AND CURING OF CONCRETE

(71) Applicant: SAUDI ARABIAN OIL COMPANY, Dhahran (SA)

(72) Inventors: Mohammed Al Mehthel, Dhahran (SA); Sami A. Al Abduljabbar, Dhahran (SA); Waseem Rahim Khatri, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 494 days.

(21) Appl. No.: 18/184,314

(22) Filed: Mar. 15, 2023

(65) Prior Publication Data

US 2024/0308904 A1    Sep. 19, 2024

(51) Int. Cl.
| | |
|---|---|
| *C04B 7/34* | (2006.01) |
| *C04B 28/12* | (2006.01) |
| *C04B 40/00* | (2006.01) |
| *C04B 40/02* | (2006.01) |
| *C04B 103/20* | (2006.01) |
| *C04B 103/30* | (2006.01) |
| *C04B 103/48* | (2006.01) |

(52) U.S. Cl.
CPC ................ *C04B 7/34* (2013.01); *C04B 28/12* (2013.01); *C04B 40/0032* (2013.01); *C04B 40/0071* (2013.01); *C04B 40/0231* (2013.01); *C04B 2103/20* (2013.01); *C04B 2103/302* (2013.01); *C04B 2103/48* (2013.01)

(58) Field of Classification Search
CPC ....... C04B 7/34; C04B 28/12; C04B 40/0032; C04B 40/0071; C04B 40/0231; C04B 2103/20; C04B 2103/302; C04B 2103/48; C04B 28/10; C04B 38/103; C04B 28/04; C09K 8/473
See application file for complete search history.

(56) References Cited

U.S. PATENT DOCUMENTS

| | | |
|---|---|---|
| 9,028,607 B2 | 5/2015 | Ramme |
| 9,505,657 B2 | 11/2016 | Ciuperca |
| 9,938,199 B1 | 4/2018 | Al-Mehthel |
| 10,668,443 B2 | 6/2020 | Kuppler et al. |
| 10,683,237 B2 | 6/2020 | Lee et al. |
| 10,894,743 B2 | 1/2021 | Amr et al. |
| 2006/0185560 A1 | 8/2006 | Ramme et al. |
| 2018/0118622 A1 | 5/2018 | Monkman et al. |
| 2020/0331805 A1 | 10/2020 | Guynn |
| 2021/0380494 A1 | 12/2021 | Gong |

FOREIGN PATENT DOCUMENTS

| | | | |
|---|---|---|---|
| CA | 3047341 A1 * | 7/2018 | ............. C04B 28/04 |
| CN | 114907068 A | 8/2022 | |
| WO | 2020163945 A1 | 8/2020 | |

OTHER PUBLICATIONS

Written Opinion and International Search Report from corresponding PCT Application No. PCT/US2024/019714 mailed Oct. 11, 2024.

Caijun Shi, Fuqiang He , Yanzhong Wu "Effect of pre-conditioning on CO2 curing of lightweight concrete blocks mixtures. Used CO2 in curing of precast concrete and developed pre-conditioning", Construction and Building Materials 26 (2012) 257-267, Jan. 2011, did not consider the use of Co2 in mixing or use of lime.

Shao, Yixin,Beneficial Use of Carbon Dioxide in Precast Concrete Production, Final Report, 2014. Did not consider use of CO2 in the mixing, use of foam agent, CO2 in the mixing or precondition periods for mixing or curing.

Carbon cure technology, considered the CO2 in mixing only.

He, Zhen; Zhen Li; and Yixin Shao—"Effect of Carbonation Mixing on CO2 Uptake and Strength Gain in Concrete" Journal of Materials in Civil Engineering . Oct. 2017. Did not use foam, lime or air entrained admixtures.

Shao, Yixin and Hilal El-Hassan, CO2 Utilization in Concrete, 3rd International Conference on Sustainable Construction Materials. Did not use foam, lime or air entrained admixtures.

Valdez, Pedro & Fajardo San Miguel, Gerardo & Juarez, Cesar & Duran-Herrera, Alejandro & Real, J.. (2015). Influence of CO2 Curing in Activated Fly Ash—Portland Cement Masonry Units. Revista Romana de materiale = Romanian journal of materials = RRM. 45. 14-20.

Ismael Justo-Reinoso, Bianca J. Reeksting, Charlotte Hamley-Bennett, Andrew Heath, Susanne Gebhard, Kevin Paine, Air-entraining admixtures as a protection method for bacterial spores in self-healing cementitious composites: Healing evaluation of early and later-age cracks, Construction and Building Materials, vol. 327, 2022, 126877, ISSN 0950-0618.

Monkman, S., MacDonald, M. & Hooton, D. Using carbon dioxide as a beneficial admixture in ready-mixed concrete. NRMCA 2015 International Concrete Sustainability Conference (2015).

* cited by examiner

*Primary Examiner* — Anthony J Green
(74) *Attorney, Agent, or Firm* — Vorys, Sater, Seymour and Pease LLP

(57) ABSTRACT

Cementitious compositions comprising lime, which may be foamed or non-foamed compositions, may increase carbon dioxide uptake of the cementitious compositions. Said cementitious compositions may be used in various cementing methods including pre-casting methods, cast-in-place methods, and primary or secondary cementing operations in a wellbore. The carbon dioxide may be added to the cementitious compositions during mixing, during pre-conditioning, during curing, or any combination thereof. Further, the carbon dioxide may be delivered as a gas (e.g., a gas that includes 1 vol % to 100 vol % carbon dioxide) or as a gas-entrained admixture that includes the gas, water, and a foaming agent.

6 Claims, No Drawings

COMPOSITIONS AND METHODS RELATING TO INCREASED CARBON DIOXIDE UPTAKE IN MIXING AND CURING OF CONCRETE

FIELD OF THE DISCLOSURE

The present disclosure relates generally to compositions and methods that increase carbon dioxide uptake in mixing and curing of concrete.

BACKGROUND OF THE DISCLOSURE

Carbonation of cements hydration products uses carbon dioxide to convert calcium-containing minerals into concrete. For example, calcium hydroxide (CH) and calcium silicate hydrate (C—S—H) reacts with carbon dioxide to produce $CaCO_3$. This process typically has a faster curing time than traditional hydration curing.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

An embodiment consistent with the present disclosure includes a method comprising: mixing the cementitious composition of Embodiment A; injecting a gas into the cementitious composition, the gas comprising carbon dioxide; placing the cementitious composition having the gas therein in a desired location; and allowing the cementitious composition having the gas therein to cure to a concrete composition.

Another embodiment consistent with the present disclosure includes a method comprising: mixing a cementitious composition comprising: a cement binder at 0 $kg/m^3$ to 500 $kg/m^3$ based on a dry weight of a cementitious composition; optionally, a secondary cementitious material at 0.1 $kg/m^3$ to 350 $kg/m^3$ based on the dry weight of the cementitious composition; lime at 0.1 $kg/m^3$ to 500 $kg/m^3$ based on the dry weight of the cementitious composition; fine aggregates at 300 $kg/m^3$ to 1500 $kg/m^3$ based on the dry weight of the cementitious composition; and coarse aggregates at 300 $kg/m^3$ to 1200 $kg/m^3$ based on the dry weight of the cementitious composition; and wherein the cementitious composition has a maximum dry weight of 2000 $kg/m^3$; injecting a gas-entrained admixture into the cementitious composition, the gas-entrained mixture comprising carbon dioxide, water in a weight ratio to the cement binder, the secondary cementitious material, and the lime cumulatively of 0.2:1 to 0.8:1, and a foaming agent at 0.01 wt % to 1 wt % based on a weight of the water; placing the cementitious composition having the gas-entrained mixture therein in a desired location; and allowing the cementitious composition to cure to a concrete composition.

Yet another embodiment consistent with the present disclosure includes a method comprising: placing a cementitious composition in a mold, the cementitious composition comprising: a cement at 0 $kg/m^3$ to 500 $kg/m^3$ based on a dry weight of the cementitious composition; optionally, a secondary cementitious material at 0.1 $kg/m^3$ to 350 $kg/m^3$ based on the dry weight of the cementitious composition;

lime at 0.1 $kg/m^3$ to 500 $kg/m^3$ based on the dry weight of the cementitious composition; fine aggregates at 300 $kg/m^3$ to 1500 $kg/m^3$ based on the dry weight of the cementitious composition; coarse aggregates at 300 $kg/m^3$ to 1200 $kg/m^3$ based on the dry weight of the cementitious composition; and wherein the cementitious composition has a dry weight of 2000 $kg/m^3$ to 4000 $kg/m^3$; exposing the cementitious composition in the mold to air for a pre-conditioning period to produce a pre-conditioned member; placing the pre-conditioned member in an enclosure; and curing the pre-conditioned member by exposing the pre-conditioned member to a gas comprising carbon dioxide to produce a concrete member.

Another embodiment consistent with the present disclosure includes a method comprising: placing a cementitious composition in a mold, the cementitious composition comprising a cement at 0 $kg/m^3$ to 500 $kg/m^3$ based on a dry weight of the cementitious composition; lime at 0.1 $kg/m^3$ to 500 $kg/m^3$ based on the dry weight of the cementitious composition; fine aggregates at 300 $kg/m^3$ to 1500 $kg/m^3$ based on the dry weight of the cementitious composition; coarse aggregates at 300 $kg/m^3$ to 1200 $kg/m^3$ based on the dry weight of the cementitious composition; and wherein the cementitious composition has a dry weight of 2000 $kg/m^3$ to 4000 $kg/m^3$; exposing the cementitious composition in the mold to water and a gas comprising carbon dioxide to produce a pre-conditioned member; removing a portion of the mold from the pre-conditioned member; further exposing the pre-conditioned member to the water and/or the gas comprising carbon dioxide; and allowing the pre-conditioned member to set to a concrete member.

According to an embodiment consistent with the present disclosure includes a cementitious composition (e.g., for producing a foamed concrete composition) that comprises: a cement binder at 0 $kg/m^3$ to 500 $kg/m^3$ based on a dry weight of the cementitious composition; optionally, a secondary cementitious material at 0.1 $kg/m^3$ to 350 $kg/m^3$ based on the dry weight of the cementitious composition; lime at 0.1 $kg/m^3$ to 500 $kg/m^3$ based on the dry weight of the cementitious composition; fine aggregates at 300 $kg/m^3$ to 1500 $kg/m^3$ based on the dry weight of the cementitious composition; coarse aggregates at 300 $kg/m^3$ to 1200 $kg/m^3$ based on the dry weight of the cementitious composition; water in a weight ratio to the cement binder, the secondary cementitious material, and the lime cumulatively of 0.2:1 to 0.8:1; and a foaming agent at 0.01 wt % to 1 wt % based on a weight of the water; and wherein the cementitious composition has a maximum dry weight of 2000 $kg/m^3$.

An embodiment consistent with the present disclosure includes a cementitious composition (e.g., for producing a non-foamed concrete composition) comprising: a cement at 0 $kg/m^3$ to 500 $kg/m^3$ based on a dry weight of the cementitious composition; optionally, a secondary cementitious material at 0.1 $kg/m^3$ to 350 $kg/m^3$ based on the dry weight of the cementitious composition; lime at 0.1 $kg/m^3$ to 500 $kg/m^3$ based on the dry weight of the cementitious composition; fine aggregates at 300 $kg/m^3$ to 1500 $kg/m^3$ based on the dry weight of the cementitious composition; coarse aggregates at 300 $kg/m^3$ to 1200 $kg/m^3$ based on the dry weight of the cementitious composition; water in a weight ratio to the cement binder, the secondary cementitious material, and the lime cumulatively of 0.2:1 to 0.8:1; and a gas entrained in the cementitious composition at 0.01 wt % to 2 wt % based on a total weight of cementitious components in the cementitious composition, wherein the gas comprises carbon dioxide; and wherein the cementitious composition has a dry weight of 2000 $kg/m^3$ to 4000 $kg/m^3$.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

The present disclosure relates generally to compositions and methods that increase carbon dioxide uptake in concrete and cementitious products. More specifically, the compositions include lime that reacts with water to produce calcium hydroxide, which reacts with carbon dioxide to produce calcium carbonate ($CaCO_3$). The inclusion of lime in the cementitious compositions described herein increases the weight percent of reactants that react with carbon dioxide and, therefore, may increase the uptake of carbon dioxide (or the increase of carbon dioxide sequestration) when producing the concrete compositions described herein.

As used herein, the term "cementitious composition" refers to a mixture of components that is capable of being cured to form a concrete composition. As used herein, the term "concrete composition" refers to a cured cementitious composition.

The concrete compositions of the present disclosure may be low density, foamed concrete compositions or non-foamed concrete compositions.

Foamed Cementitious Compositions and Related Methods

A foamed concrete composition may be produced from a foamed cementitious composition that includes lime, fine aggregates, coarse aggregates, water, a foaming agent, gas, optionally cement binder, optionally a secondary cementitious material, and optionally additives.

The foamed cementitious composition may have a maximum dry weight of 2000 kg/m$^3$ (or 1750 kg/m$^3$, or 1500 kg/m$^3$, or 1250 kg/m$^3$). The foamed cementitious composition may have a dry weight of 1000 kg/m$^3$ to 2000 kg/m$^3$ (or 1000 kg/m$^3$ to 1500 kg/m$^3$, or 1250 kg/m$^3$ to 1750 kg/m$^3$, or 1500 kg/m$^3$ to 2000 kg/m$^3$).

The lime may be present in the foamed cementitious composition at an amount of 0.1 kg/m$^3$ to 500 kg/m$^3$ (or 0.1 kg/m$^3$ to 250 kg/m$^3$, or 100 kg/m$^3$ to 300 kg/m$^3$, or 250 kg/m$^3$ to 500 kg/m$^3$) based on the dry weight of the foamed cementitious composition.

The cement binder may be present in the foamed cementitious composition at an amount of 0 kg/m$^3$ to 500 kg/m$^3$ (or 0.1 kg/m$^3$ to 500 kg/m$^3$, or 0.1 kg/m$^3$ to 250 kg/m$^3$, or 100 kg/m$^3$ to 300 kg/m$^3$, or 250 kg/m$^3$ to 500 kg/m$^3$) based on a dry weight of the foamed cementitious composition.

The cement binder may include, but is not limited to, tricalcium silicate ($Ca_3SiO_5$ or $3CaO \cdot SiO_2$), dicalcium silicate ($Ca_2SiO_4$ or $2CaO \cdot SiO_2$), tricalcium aluminate ($Ca_3Al_2O_6$ or $3CaO \cdot Al_2O_3 \cdot Fc_2O_3$), tetracalcium aluminoferrite ($Ca_4Al_2Fe_2O_{10}$ or $4CaO \cdot Al_2O_3 \cdot Fc_2O_3$), gypsum ($CaSO_4 \cdot 2H_2O$), the like, and any combination thereof. Portland cement is an example cement binder that may be used in the foamed cementitious compositions described herein.

The secondary cementitious material may be present in the foamed cementitious composition at an amount of 0 kg/m$^3$ to 350 kg/m$^3$ (or 0.1 kg/m$^3$ to 350 kg/m$^3$, or 0.1 kg/m$^3$ to 150 kg/m$^3$, or 100 kg/m$^3$ to 250 kg/m$^3$, or 200 kg/m$^3$ to 350 kg/m$^3$) based on a dry weight of the foamed cementitious composition.

Examples of secondary cementitious materials may include, but are not limited to, fly ash, silica fume, blast furnace slag and recycled materials such as plastic, steel dust, volcanic ash, oil ash, red muds, bag house dust, slag, gypsum, kiln dust, the like, and any combination thereof.

Various types of conventional aggregates can be used as a filler in the concrete compositions. The aggregate may include chemically inert and solid bodies having various shapes and sizes. As used in the present disclosure, the term "chemically inert" may refer to substances that have a sufficiently great energy barrier to reactions with other substances such that it is practically inactive with respect to chemical reactions. Aggregate can include, for example, sand, gravel, crushed rock, slag, or any other type of aggregate. When aggregate is used in concrete, the cement generally coats the aggregates and then binds them together in a matrix. When aggregates of various sizes are used, the smaller aggregate materials can fill voids between the larger aggregate materials, thus creating a denser matrix. The aggregates used in concrete can be defined in terms of coarse aggregate and fine aggregate. Fine aggregates, also referred to as "fines," can include natural sand, crushed stone, or other suitable fine particles, with most particles smaller than 5 mm. Coarse aggregates generally include gravel or crushed stone with particles predominantly larger than 5 mm and typically between 9.5 mm and 37.5 mm.

The fine aggregates may be present in the foamed cementitious composition at an amount of 300 kg/m$^3$ to 1500 kg/m$^3$ (or 300 kg/m$^3$ to 600 kg/m$^3$, or 500 kg/m$^3$ to 1000 kg/m$^3$, or 750 kg/m$^3$ to 1250 kg/m$^3$, or 1000 kg/m$^3$ to 1500 kg/m$^3$) based on a dry weight of the foamed cementitious composition.

The coarse aggregates may be present in the foamed cementitious composition at an amount of 300 kg/m$^3$ to 1200 kg/m$^3$ (or 300 kg/m$^3$ to 600 kg/m$^3$, or 500 kg/m$^3$ to 1000 kg/m$^3$, or 750 kg/m$^3$ to 1200 kg/m$^3$) based on a dry weight of the foamed cementitious composition.

Examples of aggregates (which may be fine or coarse depending on the size) may include, but are not limited to, vermiculite, ceramic spheres, perlite, expandable clay, shale, slate, crushed brick, natural sand, gravel, crushed concrete, steel shot, iron shot, steel pellets, iron pellets, the like, and any combination thereof.

The water may be present in the foamed cementitious composition at a weight ratio to the cement binder, the secondary cementitious material (if included), and the lime cumulatively (i.e., a weight ratio of water:(cement plus secondary cementitious material plus lime)) of 0.2:1 to 0.8:1 (or 0.2:1 to 0.6:1, or 0.5:1 to 0.8:1).

The foaming agent may be present in the foamed cementitious composition at an amount of 0.01 wt % to 1 wt % (0.01 wt % to 0.5 wt %, or 0.1 wt % to 1 wt %) based on a weight of the water.

Examples of foaming agents may include, but are not limited to, a betaine (e.g., hydroxysulfobetaine), a hydroxysultaine (e.g., cocoamidopropyl hydroxysultaine), the like, and any combination thereof. A commercially-available foaming agent that contains cocoamidopropyl hydroxysultaine is PETROSTEP™ SB (cocoamidopropyl hydroxysultaine in water, available from Stepan Company).

The additives, when included, may be present in the foamed cementitious composition at an amount of 0.1 wt % to 10 wt % (or 0.1 wt % to 5 wt %, or 3 wt % to 7 wt %, or 5 wt % to 10 wt %) based on a total weight of cementitious components of the composition (e.g., the lime, the cement binder, and the secondary cementitious materials, if included).

Examples of additives may include, but are not limited to, polymers, colorants, retardants, accelerants, extenders, weighting agents, fluid loss control agents, lost circulation control agents, the like, and any combination thereof.

For example, a foamed cementitious composition may include a mixture of water reducers and retarders in a total amount of 0.1 wt % to 5 wt % based on a total weight of the cementitious components of the composition (e.g., the lime, the cement binder, and the secondary cementitious materials, if included).

The components of the foamed cementitious composition except the gas may be mixed, then the gas may be entrained in the mixture to produce a foamed cementitious composition. Alternatively, the gas may be entrained in a component or mixture of components (e.g., a mixture of water and foaming agent) before mixing with the other components to produce a foamed cementitious composition. Said gas may comprise carbon dioxide to facilitate carbonation curing. Said gas may include carbon dioxide at an amount of 1 vol % to 100 vol % (or 1 vol % to 10 vol %, or 10 vol % to 50 vol %, or 30 vol % to 60 vol %, or 50 vol % to 80 vol %, or 70 vol % to 100 vol %).

The gas may be present in the foamed cementitious composition at an amount of 0.01 wt % to 2 wt % (0.01 wt % to 1 wt %, or 0.5 wt % to 2 wt %) based on a total weight of the cementitious components of the composition (e.g., the lime, the cement binder, and the secondary cementitious materials, if included). The gas may be added into the other components alone or as part of a gas-entrained admixture that comprises the gas, at least a portion of the water, and at least a portion of the foaming agent.

Mixing of the components of a foamed cementitious composition may occur, for example, in a central mixer, a truck mixer, a volumetric mixer, a portable mixture, and the like.

For example, the components of the foamed cementitious composition except the gas may be mixed for 1 minute to 30 minutes or longer (or 1 minute to 5 minutes, or 5 minutes to 15 minutes, or 10 minutes to 30 minutes or longer). Then, the gas may be added (e.g., entrained) in the mixture and further mixed for 5 seconds to 5 minutes (or 5 seconds to 2 minutes, or 30 seconds to 3 minutes, or 1 minute to 5 minutes) before placing the cementitious composition in a desired location (e.g., in a mold for pre-casting or cast-in-place applications, or down a wellbore for primary or secondary cementing operations).

In another example, a portion of the components of the foamed cementitious composition except the gas and remaining components (e.g., gas in water and foaming agent or gas in water) may be mixed for 1 minute to 30 minutes or longer (or 1 minute to 5 minutes, or 5 minutes to 15 minutes, or 10 minutes to 30 minutes or longer). Then, the gas and remaining components may be added (e.g., entrained) in the mixture and further mixed for 5 seconds to 5 minutes (or 5 seconds to 2 minutes, or 30 seconds to 3 minutes, or 1 minute to 5 minutes) before placing the cementitious composition in a desired location (e.g., in a mold for pre-casting or cast-in-place applications, or down a wellbore for primary or secondary cementing operations).

In methods of preparing a cementitious composition and/ or a concrete composition where gas is entrained before placement of the cementitious composition is placed in a desired location, the uptake of carbon dioxide (or the amount of carbon dioxide consumed in curing) may be 1 wt % to 20 wt % (or 1 wt % to 5 wt %, or 5 wt % to 15 wt %, or 10 wt % to 20 wt %) based on a total weight of the cementitious components of the composition (e.g., the lime, the cement binder, and the secondary cementitious materials, if included).

Non-Foamed Cementitious Compositions and Related Methods

A non-foamed concrete composition may be produced from a gas-entrained cementitious composition that includes lime, fine aggregates, coarse aggregates, water, gas, optionally cement binder, optionally a secondary cementitious material, and optionally additives. The gas-entrained cementitious composition may be absent of foaming agents. The compositions of the individual components of the foamed cementitious composition disclosed herein are applicable to the compositions of the individual components of the gas-entrained cementitious composition of the present disclosure.

The gas-entrained cementitious composition may have a minimum dry weight of 2000 kg/m$^3$ (or 2250 kg/m$^3$, or 2500 kg/m$^3$, or 2750 kg/m$^3$). The gas-entrained cementitious composition may have a dry weight of 2000 kg/m$^3$ to 4000 kg/m$^3$ (or 2000 kg/m$^3$ to 3000 kg/m$^3$, or 2500 kg/m$^3$ to 3500 kg/m$^3$, or 2500 kg/m$^3$ to 4000 kg/m$^3$).

The lime may be present in the gas-entrained cementitious composition at an amount of 0.1 kg/m$^3$ to 500 kg/m$^3$ (or 0.1 kg/m$^3$ to 250 kg/m$^3$, or 100 kg/m$^3$ to 300 kg/m$^3$, or 250 kg/m$^3$ to 500 kg/m$^3$) based on the dry weight of the gas-entrained cementitious composition.

The cement binder may be present in the gas-entrained cementitious composition at an amount of 0 kg/m$^3$ to 500 kg/m$^3$ (or 0.1 kg/m$^3$ to 500 kg/m$^3$, or 0.1 kg/m$^3$ to 250 kg/m$^3$, or 100 kg/m$^3$ to 300 kg/m$^3$, or 250 kg/m$^3$ to 500 kg/m$^3$) based on a dry weight of the gas-entrained cementitious composition.

The secondary cementitious material may be present in the gas-entrained cementitious composition at an amount of 0 kg/m$^3$ to 350 kg/m$^3$ (or 0.1 kg/m$^3$ to 350 kg/m$^3$, or 0.1 kg/m$^3$ to 150 kg/m$^3$, or 100 kg/m$^3$ to 250 kg/m$^3$, or 200 kg/m$^3$ to 350 kg/m$^3$) based on a dry weight of the gas-entrained cementitious composition.

The fine aggregates may be present in the gas-entrained cementitious composition at an amount of 300 kg/m$^3$ to 1500 kg/m$^3$ (or 300 kg/m$^3$ to 600 kg/m$^3$, or 500 kg/m$^3$ to 1000 kg/m$^3$, or 750 kg/m$^3$ to 1250 kg/m$^3$, or 1000 kg/m$^3$ to 1500 kg/m$^3$) based on a dry weight of the gas-entrained cementitious composition.

The coarse aggregates may be present in the gas-entrained cementitious composition at an amount of 300 kg/m$^3$ to 1200 kg/m$^3$ (or 300 kg/m$^3$ to 600 kg/m$^3$, or 500 kg/m$^3$ to 1000 kg/m$^3$, or 750 kg/m$^3$ to 1200 kg/m$^3$) based on a dry weight of the gas-entrained cementitious composition.

The water may be present in the gas-entrained cementitious composition at a weight ratio to the cement binder, the secondary cementitious material (if included), and the lime cumulatively of 0.2:1 to 0.8:1 (or 0.2:1 to 0.6:1, or 0.5:1 to 0.8:1).

The additives, when included, may be present in the gas-entrained cementitious composition at an amount of 0.1 wt % to 10 wt % (or 0.1 wt % to 5 wt %, or 3 wt % to 7 wt %, or 5 wt % to 10 wt %) based on a total weight of the cementitious components of the composition (e.g., the lime, the cement binder, and the secondary cementitious materials, if included).

The gas may be present in the gas-entrained cementitious composition at an amount of 0.01 wt % to 2 wt % (0.01 wt % to 1 wt %, or 0.5 wt % to 2 wt %) based on a total weight of the cementitious components of the composition (e.g., the lime, the cement binder, and the secondary cementitious materials, if included).

The components of the gas-entrained cementitious composition except the gas may be mixed, then the gas may be entrained in the mixture to produce a gas-entrained cementitious composition. Alternatively, the gas may be entrained in a component or mixture of components (e.g., a mixture of a portion of the water and one or more additives) (also referred to herein as a gas-entrained admixture) before mixing with the other components (e.g. cement, the remaining water, aggregates, and the like) to produce a gas-entrained cementitious composition. The gas-entrained admixture may create air bubbles in the gas-entrained cementitious composition.

Mixing of the components of a gas-entrained cementitious composition may occur, for example, in a central mixer, a truck mixer, a volumetric mixer, a portable mixture, and the like.

For example, the components of the gas-entrained cementitious composition except the gas may be mixed for 1 minute to 30 minutes or longer (or 1 minute to 5 minutes, or 5 minutes to 15 minutes, or 10 minutes to 30 minutes or longer). Then, the gas may be added (e.g., entrained) in the mixture and further mixed for 5 seconds to 5 minutes (or 5 seconds to 2 minutes, or 30 seconds to 3 minutes, or 1 minute to 5 minutes) before placing the cementitious composition in a desired location (e.g., in a mold for pre-casting or cast-in-place applications, or down a wellbore for primary or secondary cementing operations).

In another example, a portion of the components of the gas-entrained cementitious composition except the gas and remaining components (e.g., gas in water and optionally with one or more additives) may be mixed for 1 minute to 30 minutes or longer (or 1 minute to 5 minutes, or 5 minutes to 15 minutes, or 10 minutes to 30 minutes or longer). Then, the gas and remaining components may be added (e.g., entrained) in the mixture and further mixed for 5 seconds to 5 minutes (or 5 seconds to 2 minutes, or 30 seconds to 3 minutes, or 1 minute to 5 minutes) before placing the cementitious composition in a desired location (e.g., in a mold for pre-casting or cast-in-place applications, or down a wellbore for primary or secondary cementing operations).

In methods of preparing a cementitious composition and/or a concrete composition where gas is entrained before placement of the cementitious composition is placed in a desired location, the uptake of carbon dioxide (or the amount of carbon dioxide consumed in curing) may be 1 wt % to 20 wt % (or 1 wt % to 5 wt %, or 5 wt % to 15 wt %, or 10 wt % to 20 wt %) based on a total weight of the cementitious components of the composition (e.g., the lime, the cement binder, and the secondary cementitious materials, if included).

Precast Cementitious Compositions and Related Methods

A precast concrete composition may be produced from a cementitious composition that includes lime, fine aggregates, coarse aggregates, water, optionally a cement binder, optionally a secondary cementitious material, and optionally additives. The cementitious composition may be absent of foaming agents. The compositions of the individual components of the foamed cementitious composition disclosed herein are applicable to the compositions of the individual components of the cementitious composition of the present disclosure for precast methods.

The cementitious composition for precast methods may have a minimum dry weight of 2000 kg/m$^3$ (or 2250 kg/m$^3$, or 2500 kg/m$^3$, or 2750 kg/m$^3$). The cementitious composition may have a dry weight of 2000 kg/m$^3$ to 4000 kg/m$^3$ (or 2000 kg/m$^3$ to 3000 kg/m$^3$, or 2500 kg/m$^3$ to 3500 kg/m$^3$, or 2500 kg/m$^3$ to 4000 kg/m$^3$).

The lime may be present in the cementitious composition for precast methods at an amount of 0.1 kg/m$^3$ to 500 kg/m$^3$ (or 0.1 kg/m$^3$ to 250 kg/m$^3$, or 100 kg/m$^3$ to 300 kg/m$^3$, or 250 kg/m$^3$ to 500 kg/m$^3$) based on the dry weight of the cementitious composition.

The cement binder may be present in the cementitious composition for precast methods at an amount of 0 kg/m$^3$ to 500 kg/m$^3$ (or 0.1 kg/m$^3$ to 500 kg/m$^3$, or 0.1 kg/m$^3$ to 250 kg/m$^3$, or 100 kg/m$^3$ to 300 kg/m$^3$, or 250 kg/m$^3$ to 500 kg/m$^3$) based on a dry weight of the cementitious composition.

The secondary cementitious material may be present in the cementitious composition for precast methods at an amount of 0 kg/m$^3$ to 350 kg/m$^3$ (or 0.1 kg/m$^3$ to 350 kg/m$^3$, or 0.1 kg/m$^3$ to 150 kg/m$^3$, or 100 kg/m$^3$ to 250 kg/m$^3$, or 200 kg/m$^3$ to 350 kg/m$^3$) based on a dry weight of the cementitious composition.

The fine aggregates may be present in the cementitious composition for precast methods at an amount of 300 kg/m$^3$ to 1500 kg/m$^3$ (or 300 kg/m$^3$ to 600 kg/m$^3$, or 500 kg/m$^3$ to 1000 kg/m$^3$, or 750 kg/m$^3$ to 1250 kg/m$^3$, or 1000 kg/m$^3$ to 1500 kg/m$^3$) based on a dry weight of the cementitious composition.

The coarse aggregates may be present in the cementitious composition for precast methods at an amount of 300 kg/m$^3$ to 1200 kg/m$^3$ (or 300 kg/m$^3$ to 600 kg/m$^3$, or 500 kg/m$^3$ to 1000 kg/m$^3$, or 750 kg/m$^3$ to 1200 kg/m$^3$) based on a dry weight of the cementitious composition.

The water may be present in the cementitious composition for precast methods at a weight ratio to the cement binder, the secondary cementitious material (if included), and the lime cumulatively of 0.1:1 to 0.8:1 (or 0.1:1 to 0.6:1, or 0.5:1 to 0.8:1). Alternative to the water being present directly in the cementitious composition for precast methods, the water may be added during a pre-conditioning of the cementitious composition.

The additives, when included, may be present in the cementitious composition for precast methods at an amount of 0.1 wt % to 10 wt % (or 0.1 wt % to 5 wt %, or 3 wt % to 7 wt %, or 5 wt % to 10 wt %) based on a total weight of the cementitious components of the composition (e.g., the lime, the cement binder, and the secondary cementitious materials, if included).

In a precast method, the components of the cementitious composition may be molded (e.g., added to a mold) and exposed to water (e.g., steam or water) to provide a pre-condition. A sufficient amount of water should be provided so that the cementitious composition holds its shape when the mold is removed but not so much water that the cementitious composition is completely cured.

For example, the components of the cementitious composition may be placed in a mold and consolidated. Then, the components in the mold may be exposed to air for a pre-conditioning period, followed with curing with $CO_2$. For curing, the components in the mold may be exposed to the $CO_2$ in the surrounding environment. Alternatively, a covering may be placed on the mold that allows $CO_2$ to be passed through the covering, which allows for exposure to a higher $CO_2$ concentration. Advantageously, the covering may mitigate water evaporation when curing with $CO_2$ is used in combination with a exposure to water The exposure to $CO_2$ can be combined with one or more other curing method, if needed, which may include, but are not limited to, (a) passing steam through the cementitious composition, (b) lining the mold with a wet fabric sheet (e.g., burlap), (c) wrapping the cementitious composition and/or mold with a wet fabric sheet, the like, and any combination thereof. To facilitate water contacting the cementitious composition, all or a portion of the mold, wet fabric, or the like may be wrapped (or sealed) in a plastic sheet.

Pre-conditioning may be at a temperature of 20° C. to 50° C. and at a pressure of atmospheric pressure to 10 psi above atmospheric pressure.

Pre-conditioning may be for a time of 30 minutes to 180 minutes or longer (or 30 minutes to 75 minutes, or 60 minutes to 90 minutes, or 75 minutes to 180 minutes or longer).

Pre-conditioning produces a pre-conditioned member. After preconditioning, the pre-conditioned member may be placed in an enclosure (e.g., removed from the mold and placed in a curing chamber or other suitable enclosure; or covered with a cover (e.g., a nonmetallic cover, an adjustable cover, or an adjustable, nonmetallic cover) where the mold and cover form the enclosure) where the pre-conditioned member is exposed to the gas (the gas portion of the cementitious composition) comprising carbon dioxide to facilitate curing of the pre-conditioned member into a concrete member. Optionally, the pre-conditioned member may also be exposed to water during curing.

By way of nonlimiting example, an adjustable cover may cover at least a portion of the pre-conditioned member. Preferably, the adjustable cover is formed with nonmetallic materials (e.g., polypropylene, polyethylene, polyvinylchloride, polycarbonate, the like, and any combination thereof). The adjustable cover may be two or more slidably connected pieces that move longitudinally and/or transversely with respect to each other, where once in a desired configuration, joints should be sealed to provide the desired environment around the pre-conditioned member. The adjustable cover may be positioned 2.5 cm to 15 cm or more from the surface of the pre-conditioned member. The adjustable cover should be designed to provide a desired environment (e.g., gas composition, temperature, pressure, relative humidity, and the like) between the pre-conditioned member and the adjustable cover. For example, the adjustable cover should have openings (e.g., closable openings) that allow gas to be passed between the adjustable cover and the pre-conditioned member so as to contact the pre-conditioned member.

The gas may include carbon dioxide at an amount of 1 vol % to 100 vol % (or 1 vol % to 10 vol %, or 10 vol % to 50 vol %, or 30 vol % to 60 vol %, or 50 vol % to 80 vol %, or 70 vol % to 100 vol %).

Exposure to the gas comprising carbon dioxide may be for 2 hours to 8 hours or longer (2 hours to 4 hours, or 3 hours to 6 hours, or 5 hours to 8 hours or longer).

To facilitate curing, the environment around the pre-conditioned member (e.g., in a curing chamber or covered) may be at 0° C. to 90° C. (or 0° C. to 30° C., or 20° C. to 60° C., or 50° C. to 90° C.).

The environment around the pre-conditioned member may be at atmospheric pressure to 50 psi above atmospheric pressure during the curing.

A relative humidity in the curing chamber may be 50% to 95% during the curing.

The uptake of carbon dioxide (or the amount of carbon dioxide consumed in curing) in a precast method may be 30 wt % to 100 wt % (or 30 wt % to 50 wt %, or 40 wt % to 70 wt %, or 60 wt % to 100 wt %) based on a total weight of the cementitious components of the composition (e.g., the lime, the cement binder, and the secondary cementitious materials, if included).

Cast-in-Place Cementitious Compositions and Related Methods

A cast-in-place concrete composition may be produced from a cementitious composition that includes lime, fine aggregates, coarse aggregates, water, optionally a cement binder, optionally a secondary cementitious material, and optionally additives. The cementitious composition may be absent of foaming agents. The compositions of the individual components of the foamed cementitious composition disclosed herein are applicable to the compositions of the individual components of the cementitious composition of the present disclosure for cast-in-place methods.

The cementitious composition for cast-in-place methods may have a minimum dry weight of 2000 $kg/m^3$ (or 2250 $kg/m^3$, or 2500 $kg/m^3$, or 2750 $kg/m^3$). The cementitious composition may have a dry weight of 2000 $kg/m^3$ to 4000 $kg/m^3$ (or 2000 $kg/m^3$ to 3000 $kg/m^3$, or 2500 $kg/m^3$ to 3500 $kg/m^3$, or 2500 $kg/m^3$ to 4000 $kg/m^3$).

The lime may be present in the cementitious composition for cast-in-place methods at an amount of 0.1 $kg/m^3$ to 500 $kg/m^3$ (or 0.1 $kg/m^3$ to 250 $kg/m^3$, or 100 $kg/m^3$ to 300 $kg/m^3$, or 250 $kg/m^3$ to 500 $kg/m^3$) based on the dry weight of the cementitious composition.

The cement binder may be present in the cementitious composition for cast-in-place methods at an amount of 0 $kg/m^3$ to 500 $kg/m^3$ (or 0.1 $kg/m^3$ to 500 $kg/m^3$, or 0.1 $kg/m^3$ to 250 $kg/m^3$, or 100 $kg/m^3$ to 300 $kg/m^3$, or 250 $kg/m^3$ to 500 $kg/m^3$) based on a dry weight of the cementitious composition.

The secondary cementitious material may be present in the cementitious composition for cast-in-place methods at an amount of 0 $kg/m^3$ to 350 $kg/m^3$ (or 0.1 $kg/m^3$ to 350 $kg/m^3$, or 0.1 $kg/m^3$ to 150 $kg/m^3$, or 100 $kg/m^3$ to 250 $kg/m^3$, or 200 $kg/m^3$ to 350 $kg/m^3$) based on a dry weight of the cementitious composition.

The fine aggregates may be present in the cementitious composition for cast-in-place methods at an amount of 300 $kg/m^3$ to 1500 $kg/m^3$ (or 300 $kg/m^3$ to 600 $kg/m^3$, or 500 $kg/m^3$ to 1000 $kg/m^3$, or 750 $kg/m^3$ to 1250 $kg/m^3$, or 1000 $kg/m^3$ to 1500 $kg/m^3$) based on a dry weight of the cementitious composition.

The coarse aggregates may be present in the cementitious composition for cast-in-place methods at an amount of 300 $kg/m^3$ to 1200 $kg/m^3$ (or 300 $kg/m^3$ to 600 $kg/m^3$, or 500 $kg/m^3$ to 1000 $kg/m^3$, or 750 $kg/m^3$ to 1200 $kg/m^3$) based on a dry weight of the cementitious composition.

The water may be present in the cementitious composition for cast-in-place methods at a weight ratio to the cement binder, the secondary cementitious material (if included), and the lime cumulatively of 0.1:1 to 0.8:1 (or 0.1:1 to 0.6:1, or 0.5:1 to 0.8:1). Alternative to the water being present directly in the cementitious composition for cast-in-place methods, the water may be added during a pre-conditioning and/or curing of the cementitious composition.

The additives, when included, may be present in the cementitious composition for cast-in-place methods at an amount of 0.1 wt % to 10 wt % (or 0.1 wt % to 5 wt %, or 3 wt % to 7 wt %, or 5 wt % to 10 wt %) based on a total weight of the cementitious components of the composition (e.g., the lime, the cement binder, and the secondary cementitious materials, if included).

In a cast-in-place method, the components of the cementitious composition may be molded and consolidated. Then, the components may be exposed to air for the pre-conditioning period, followed with curing with $CO_2$. The $CO_2$ curing can be combined with other curing methods (e.g., exposure to water (e.g., as steam or water)). For example, the components of the cementitious composition should be subjected to pre-conditioning period prior to the start of the curing process. The curing process, after the pre-conditioning period, includes exposing the pre-conditioned cementitious composition to a gas comprising carbon dioxide (e.g., comprising 1 vol % to 100 vol % carbon dioxide) and may optionally include exposure to water. Since this is a cast-in-place method, the exposure to carbon dioxide and optionally water may involve exposing the exposed portions of the pre-conditioned cementitious composition to the carbon dioxide and water, rather than passing the carbon dioxide and water through the pre-conditioned cementitious composition.

A covering used during curing where the covering allows $CO_2$ to be passed therethrough, which allows for exposure to a higher $CO_2$ concentration. Advantageously, the covering may also mitigate water evaporation when curing with $CO_2$ is used in combination with exposure to water. Said covering may be the adjustable covering described above.

Examples of methods for water exposure may include, but are not limited to, (a) passing steam through the cementitious composition, (b) lining the cast-in-place location with a wet fabric sheet (e.g., burlap), (c) wrapping exposed portions of the cementitious composition with a wet fabric sheet, the like, and any combination thereof.

Pre-conditioning may be at a temperature of 20° C. to 50° C. and at a pressure of atmospheric pressure to 10 psi above atmospheric pressure.

Pre-conditioning may be for a time of 2 hours to 8 hours or longer (2 hours to 4 hours, or 3 hours to 6 hours, or 5 hours to 8 hours or longer).

Pre-conditioning produces a pre-conditioned member. After preconditioning, a portion of the mold may be removed from the pre-conditioned member. Then, the pre-conditioned member may be further exposed to water and/or carbon dioxide (e.g., as done in pre-conditioning).

Curing may be for 12 hours to 24 hours or longer (12 hours to 18 hours, or 18 hours to 24 hours or longer).

Curing may be at 0° C. to 150° C. (or 0° C. to 60° C., or 50° C. to 60° C.).

Curing may be at atmospheric pressure to 50 psi above atmospheric pressure. A relative humidity during curing may be 10% to 95%.

The uptake of carbon dioxide (or the amount of carbon dioxide consumed in pre-conditioning and curing combined) in a cast-in-place method may be 30 wt % to 100 wt % (or 30 wt % to 50 wt %, or 40 wt % to 70 wt %, or 60 wt % to 100 wt %) based on a total weight of the cementitious components of the composition (e.g., the lime, the cement binder, and the secondary cementitious materials, if included).

NONLIMITING EXAMPLE EMBODIMENTS

Embodiment A: A cementitious composition (e.g., a foamed cementitious composition) comprising: a cement binder at 0 kg/m³ to 500 kg/m³ based on a dry weight of the cementitious composition; optionally, a secondary cementitious material at 0.1 kg/m³ to 350 kg/m³ based on the dry weight of the cementitious composition; lime at 0.1 kg/m³ to 500 kg/m³ based on the dry weight of the cementitious composition; fine aggregates at 300 kg/m³ to 1500 kg/m³ based on the dry weight of the cementitious composition; coarse aggregates at 300 kg/m³ to 1200 kg/m³ based on the dry weight of the cementitious composition; water in a weight ratio to the cement binder, the secondary cementitious material, and the lime cumulatively of 0.2:1 to 0.8:1; and a foaming agent at 0.01 wt % to 1 wt % based on a weight of the water; and wherein the cementitious composition has a maximum dry weight of 2000 kg/m³.

Embodiment A may include one or more of: Element 1: the cementitious composition further comprising: a gas at 0.01 wt % to 2 wt % based on a total weight of cementitious components in the cementitious composition, wherein the gas comprises carbon dioxide; Element 2: Element 1 and wherein the gas is present as part of a gas-entrained admixture of the gas, at least a portion of the water, and at least a portion of the foaming agent; Element 3: Element 1 and wherein the carbon dioxide is present in the gas at 1 vol % to 100 vol %; Element 4: the cementitious composition further comprising: one or more additives at 0.1 wt % to 1 wt % based on a total weight of cementitious components in the cementitious composition; and Element 5: the cementitious composition further comprising: 0.1 wt % to 2 wt % of an admixture of a water reducer additive and a retarder additive based on the weight of the cement binder. Examples of combinations may include Element 1 in combination with Elements 2 and 3; Element 1 (optionally in combination with Element 2 and/or Element 3) in combination with one or both of Elements 4-5; and Elements 4-5 in combination.

Embodiment B: A method comprising: mixing the cementitious composition of Embodiment A; injecting a gas into the cementitious composition, the gas comprising carbon dioxide; placing the cementitious composition having the gas therein in a desired location; and allowing the cementitious composition having the gas therein to cure to a concrete composition.

Embodiment B may further include one or more of: Element 4; Element 5; Element 6: wherein the carbon dioxide is present in the gas at 1 vol % to 100 vol %; Element 7: the method further comprising: mixing of the cementitious composition having the gas therein for 1 minute to 30 minutes; Element 8: the method further comprising: exposing the cementitious composition after being placed in the desired location to a second gas that comprises carbon dioxide; and Element 9: Element 8 and wherein the carbon dioxide is present in the second gas at 1 vol % to 100 vol %. Examples of combinations include: Element 4 in combination with one or more of Elements 5-9; Element 5 in combination with one or more of Elements 6-9; Element 6 in combination with one or more of Elements 7-9; and two or more of Elements 7-9 in combination.

Embodiment C: A method comprising: mixing a mixture comprising: a cement binder at 0 kg/m³ to 500 kg/m³ based on a dry weight of a cementitious composition; optionally, a secondary cementitious material at 0.1 kg/m³ to 350 kg/m³ based on the dry weight of the cementitious composition; lime at 0.1 kg/m³ to 500 kg/m³ based on the dry weight of the cementitious composition; fine aggregates at 300 kg/m³ to 1500 kg/m³ based on the dry weight of the cementitious composition; and coarse aggregates at 300 kg/m³ to 1200 kg/m³ based on the dry weight of the cementitious composition; and wherein the cementitious composition has a maximum dry weight of 2000 kg/m³; injecting a gas-entrained admixture into the mixture to the a cementitious composition, the gas-entrained mixture comprising carbon dioxide, water in a weight ratio to the cement binder, the secondary cementitious material, and the lime cumulatively of 0.2:1 to 0.8:1, and a foaming agent at 0.01 wt % to 1 wt % based on a weight of the water; mixing the cementitious composition;

placing the cementitious composition in a desired location; and allowing the cementitious composition to cure to a concrete composition.

Embodiment C may include one or more of: Element 10: wherein the mixing of the cementitious composition is for 1 minute to 30 minutes; Element 11: the method further comprising exposing the cementitious composition after being placed in the desired location to a second gas that comprises carbon dioxide; Element 12: wherein the carbon dioxide is present in the gas at 1 vol % to 100 vol %; Element 13: wherein the cementitious composition further comprises one or more additives at 0.1 wt % to 1 wt % based on a total weight of cementitious components in the cementitious composition (wherein each of said additives may be present in the mixture, present in the gas-entrained admixture, or added separately); and Element 14: wherein the cementitious composition further comprises 0.1 wt % to 2 wt % of an admixture of a water reducer additive and a retarder additive based on the weight of the cement binder. Examples of combinations include Element 10 in combination with one or more of Elements 11-14; Element 11 in combination with one or more of Elements 12-14; and two or more of Elements 12-14 in combination.

Embodiment D: A cementitious composition (e.g., for producing a non-foamed concrete composition) comprising: a cement at 0 kg/m$^3$ to 500 kg/m$^3$ based on a dry weight of the cementitious composition; optionally, a secondary cementitious material at 0.1 kg/m$^3$ to 350 kg/m$^3$ based on the dry weight of the cementitious composition; lime at 0.1 kg/m$^3$ to 500 kg/m$^3$ based on the dry weight of the cementitious composition; fine aggregates at 300 kg/m$^3$ to 1500 kg/m$^3$ based on the dry weight of the cementitious composition; coarse aggregates at 300 kg/m$^3$ to 1200 kg/m$^3$ based on the dry weight of the cementitious composition; water in a weight ratio to the cement binder, the secondary cementitious material, and the lime cumulatively of 0.2:1 to 0.8:1; and a gas entrained in the cementitious composition at 0.01 wt % to 2 wt % based on a total weight of cementitious components in the cementitious composition, wherein the gas comprises carbon dioxide; and wherein the cementitious composition has a dry weight of 2000 kg/m$^3$ to 4000 kg/m$^3$.

Embodiment D may further include one or more of: Element 15: wherein the carbon dioxide is present in the gas at 1 vol % to 100 vol %; Element 16: the cementitious composition further one or more additives at 0.1 wt % to 1 wt % based on a total weight of cementitious components in the cementitious composition; and Element 17: the cementitious composition further comprising 0.1 wt % to 2 wt % of an admixture of a water reducer additive and a retarder additive based on the weight of the cement binder. Examples of combinations include Elements 15 and 16, Elements 16 and 17, Elements 15 and 17; and Elements 15-17.

Embodiment E: A method comprising: placing a cementitious composition in a mold, the cementitious composition comprising: a cement at 0 kg/m$^3$ to 500 kg/m$^3$ based on a dry weight of the cementitious composition; optionally, a secondary cementitious material at 0.1 kg/m$^3$ to 350 kg/m$^3$ based on the dry weight of the cementitious composition; lime at 0.1 kg/m$^3$ to 500 kg/m$^3$ based on the dry weight of the cementitious composition; fine aggregates at 300 kg/m$^3$ to 1500 kg/m$^3$ based on the dry weight of the cementitious composition; coarse aggregates at 300 kg/m$^3$ to 1200 kg/m$^3$ based on the dry weight of the cementitious composition; and wherein the cementitious composition has a dry weight of 2000 kg/m$^3$ to 4000 kg/m$^3$; exposing the cementitious composition in the mold to air for a pre-conditioning period to produce a pre-conditioned member; placing the pre-conditioned member in an enclosure; and curing the pre-conditioned member by exposing the pre-conditioned member to a gas comprising carbon dioxide to produce a concrete member.

Embodiment E may further include one or more of: Element 15; Element 16; Element 17; Element 18: wherein the exposing of the pre-conditioned member to the gas is for 2 hours to 8 hours; Element 19: the method further comprising exposing the pre-conditioned member to water; Element 20: wherein an environment inside the enclosure is at 0° C. to 90° C. during the curing; Element 21: wherein an environment inside the enclosure is at atmospheric pressure to 50 psi above atmospheric pressure during the curing; Element 22: wherein an environment inside the enclosure is at a relative humidity of 10% to 95% during the curing; Element 23: wherein the enclosure comprises an adjustable cover; and Element 24: wherein the enclosure comprises a curing chamber. Examples of combinations include two or more of Elements 15-17 in combination; one or more of Elements 15-17 in combination with one or more of Elements 18-24; Element 18 in combination with one or more of Elements 19-24; Element 19 in combination with one or more of Elements 20-24; Element 20 in combination with one or more of Elements 21-24; two or more of Elements 20-23 in combination; Element 21 in combination with one or more of Elements 22-24; and Element 22 in combination with one of Elements 23-24.

Embodiment F: A method comprising: placing a cementitious composition in a mold, the cementitious composition comprising a cement at 0 kg/m$^3$ to 500 kg/m$^3$ based on a dry weight of the cementitious composition; lime at 0.1 kg/m$^3$ to 500 kg/m$^3$ based on the dry weight of the cementitious composition; fine aggregates at 300 kg/m$^3$ to 1500 kg/m$^3$ based on the dry weight of the cementitious composition; coarse aggregates at 300 kg/m$^3$ to 1200 kg/m$^3$ based on the dry weight of the cementitious composition; and wherein the cementitious composition has a dry weight of 2000 kg/m$^3$ to 4000 kg/m$^3$; exposing the cementitious composition in the mold to water and a gas comprising carbon dioxide to produce a pre-conditioned member; removing a portion of the mold from the pre-conditioned member; further exposing the pre-conditioned member to the water and/or the gas comprising carbon dioxide; and allowing the pre-conditioned member to set to a concrete member.

Embodiment F may further include one or more of: Element 15; Element 16; Element 17; Element 25: wherein the exposing of the pre-conditioned member to the water and/or the gas is for 12 hours to 24 hours; and Element 26: where the exposure of the cementitious composition to the water and the gas comprises covering the mold and/or a portion of the cementitious composition in a wet fabric sheet. Examples of combinations include two or more of Elements 15-17 in combination; one or more of Elements 15-17 in combination with one or more of Elements 25-26; and Element 25-26 in combination.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method comprising:

mixing a cementitious composition comprising:

lime at 0.1 kg/m$^3$ to 500 kg/m$^3$ based on the dry weight of the cementitious composition;

a cement binder at 0.1 kg/m$^3$ to 500 kg/m$^3$ based on a dry weight of the cementitious composition;

optionally, a secondary cementitious material at 0.1 kg/m$^3$ to 350 kg/m$^3$ based on the dry weight of the cementitious composition;

fine aggregates at 300 kg/m$^3$ to 1500 kg/m$^3$ based on the dry weight of the cementitious composition;

coarse aggregates at 300 kg/m$^3$ to 1200 kg/m$^3$ based on the dry weight of the cementitious composition;

water in a weight ratio to the cement binder, the secondary cementitious material, and the lime cumulatively of 0.2:1 to 0.8:1; and a foaming agent at 0.01 wt % to 1 wt % based on a weight of the water; and wherein the cementitious composition has a maximum dry weight of 2000 kg/m$^3$;

wherein the cementitious composition except a gas is mixed for at least 1 minute to 30 minutes, the gas comprising carbon dioxide; subsequently, injecting the gas into the cementitious composition and mixing at least 5 seconds to 5 minutes; subsequently, placing the cementitious composition having the gas therein in a desired location; and allowing the cementitious composition having the gas therein to cure to a concrete composition.

2. The method of claim 1 further comprising:

mixing of the cementitious composition having the gas therein for at least 30 seconds to 3 minutes.

3. The method of claim 1, wherein the gas is a first gas, and wherein the method further comprises:

exposing the cementitious composition after being placed in the desired location to a second gas that comprises carbon dioxide.

4. The method of claim 1, wherein the carbon dioxide is present in the gas at 1 vol % to 100 vol %.

5. The method of claim 1, wherein the cementitious composition further comprises one or more additives at 0.1 wt % to 1 wt % based on a total weight of cementitious components in the cementitious composition.

6. The method of claim 1, wherein the cementitious composition further comprises 0.1 wt % to 2 wt % of an admixture of a water reducer additive and a retarder additive based on the weight of the cement binder.

* * * * *